US007338032B2

(12) United States Patent
Sykes, Jr.

(10) Patent No.: US 7,338,032 B2
(45) Date of Patent: Mar. 4, 2008

(54) LEVERAGE UTILIZING BAR FOR FACILITATING PRYING A FLAT MEMBER FROM A SLENDER MEMBER

(76) Inventor: Gerald E. Sykes, Jr., 13 Brooklyn Rd., Pomfret Center, CT (US) 06259

( * ) Notice: Subject to any disclaimer, the term of this patent is extended or adjusted under 35 U.S.C. 154(b) by 532 days.

(21) Appl. No.: 10/981,280

(22) Filed: Nov. 4, 2004

(65) Prior Publication Data

US 2006/0091366 A1 May 4, 2006

(51) Int. Cl.
*B23P 19/02* (2006.01)

(52) U.S. Cl. .......................................... 254/25; 254/21

(58) Field of Classification Search .................. 254/25, 254/19, 21, 18, 131
See application file for complete search history.

(56) References Cited

U.S. PATENT DOCUMENTS

| | | | | |
|---|---|---|---|---|
| 815,064 | A | 3/1906 | Campbell | |
| 1,309,735 | A * | 7/1919 | Hemfling | 123/223 |
| 3,134,574 | A | 5/1964 | Reuterfors | |
| 4,039,140 | A * | 8/1977 | Pulliam | 254/25 |
| 4,182,390 | A | 1/1980 | Renner | |
| 5,165,659 | A | 11/1992 | L'Heureux | |
| 5,176,363 | A | 1/1993 | Bowlin | |
| 5,447,289 | A | 9/1995 | Callahan | |
| 6,070,498 | A | 6/2000 | Mislich et al. | |
| 6,260,824 | B1 * | 7/2001 | Aderhold | 254/17 |
| 6,446,401 | B1 | 9/2002 | Krupp | |
| 7,039,993 | B1 * | 5/2006 | Smith et al. | 29/235 |

* cited by examiner

*Primary Examiner*—Lee D. Wilson
(74) *Attorney, Agent, or Firm*—Richard L. Miller

(57) ABSTRACT

A leverage utilizing bar for facilitating prying a flat member from a slender member. A head extends from a handle. The head engages under the flat member and functions as a fulcrum by engaging the slender member and thereby cause the head to pry the flat member from the slender member when the handle is pushed away from the head by the fulcrum pivoting on the slender member. The head includes a pair of hook members and the handle includes a pair of shank members. The pair of hook members of the head together with the pair of shank members of the handle form a pair of main members, respectively, that are generally J-shaped. The pair of main members diverge from each other as they extend from a common proximal end to distal ends of the pair of hook members of the head so as to allow the head to straddle the slender member.

13 Claims, 1 Drawing Sheet

LEVERAGE UTILIZING BAR FOR FACILITATING PRYING A FLAT MEMBER FROM A SLENDER MEMBER

BACKGROUND OF THE INVENTION

1. Field of the Invention

The present invention relates to a bar for prying, and more particularly, the present invention relates to a leverage utilizing bar for facilitating prying a flat member from a slender member.

2. Description of the Prior Art

Numerous innovations for pry bars have been provided in the prior art that will be described. Even though these innovations may be suitable for the specific individual purposes to which they address, however, they differ from the present invention.

A FIRST EXAMPLE, U.S. Pat. No. 815,064 to Campbell teaches a combined nail-extractor and beam-adjusting tool comprising a handle-bar having an integral transverse head having an outer face curved to provide a rocking fulcrum and having at one end claws projecting from one side of the handle-bar and having on its inner face at the other side of the handle-bar a substantially rectangular recess adapted to engage around the corners of a beam.

A SECOND EXAMPLE, U.S. Pat. No. 3,134,574 to Reuterfors teaches a pinch bar made from a relatively thin strip of metal comprising, an elongated longitudinally straight handle of a length to form a relatively long lever for manipulation of the bar by the hand of a user, a relatively shorter neck at one end of the handle diverging relative to the centerline of the handle to one side of the latter, and a generally concavo-convex blade having one end joined integrally to the neck and extending therefrom crosswise of the centerline of the handle and having the major portion thereof projecting laterally from the other side of the handle, the neck and the handle having a transversely convex face at the one side of the handle and a transversely concave face at the other side of the handle, the transversely arched neck merging smoothly with the handle and the blade, the handle and the neck and portions of the blade adjacent the neck having a substantially uniform thickness and a radius of curvature that is large as compared to the width of the strip, the blade having a flattened tip portion at the other end for engaging an object, for the crosswise curve of the blade decreasing in a direction from the one end of the blade toward the other end to merge smoothly with the flattened tip portion and the width of the blade progressively increasing from the one end toward the other end, the blade being spaced axially from the one end of the handle and extending generally perpendicular thereto with the convex side of the blade facing away from the handle whereby the convex side of the blade provides an outer face that is convexly curved in a direction lengthwise of the blade and also crosswise thereof to enable rocking of the pinch bar on the outer face selectively in relatively transverse directions for loosening an object engaged by the tip portions.

A THIRD EXAMPLE, U.S. Pat. No. 4,182,390 to Renner teaches a shingle removal tool that includes a main supporting shaft having an outer handle and a shingle removing blade at the opposite end. Centrally of the supporting shaft, an angled arm is secured to and extends outwardly and upwardly for gripping by the opposite hand of the roofer. The blade has a first portion aligned with the shaft, formed with a plurality of different sized notches, and a lateral extension portion formed as a continuous chamfered blade. A side blade wall extends past the bottom end of the shaft and lifts the shingle.

A FOURTH EXAMPLE, U.S. Pat. No. 5,165,659 to L'Heureux teaches a roof-opening device for use by fire fighters to open a vent hole for the venting of gases from a burning building containing plywood panels attached to roofing beams, such device having a shaft with a handle at the top end thereof and a transversely positioned fulcrum member at the bottom end thereof and a pair of tines extending outwardly from the fulcrum member, the tines spaced apart from one another a distance to pass over on both sides of a roofing beam after the tines are passed through a slot cut in the roof generally perpendicular to such roofing beams such that the tines when maneuvered downward through the slot on each side of the roofing beam can lift the plywood panel attached thereto in incremental steps as the fulcrum member is moved along the roofing beam to separate the plywood panel from the roofing beam and open up a vent hole.

A FIFTH EXAMPLE, U.S. Pat. No. 5,176,363 to Bowlin teaches a lift bar for disassembling a structure while preserving the components for reuse that includes a handle and a fork-like member connected thereto. Upon the manual depression of the handle, the fork-like member pivots upward to pry a board or a sheet of building material away from an underlying support member. The lift bar also includes a deflecting assembly removably mounted on the handle so as to deflect a loosened sheet of material away from an operator.

A SIXTH EXAMPLE, U.S. Pat. No. 5,447,289 to Callahan teaches a pry shovel tool for wooden pallet deck board removal and similar purposes is disclosed in several embodiments. All embodiments include a general S-shaped (in cross-section), relatively thin blade made of thin spring metal, whose forward section defines a central cut-out portion sized to allow the blade to receive therein the cross member of the pallet or like and, for the sections of the blade adjoining the cut-out to penetrate below the board to be removed. In one employment, a permanent elongated handle is affixed to the rear portion of the blade. In a second embodiment, a wider blade and cut-out are provided to accommodate wider pallet cross members such as a 4.times.4 timber. A third embodiment has a blade equipped with means for manually attaching removable handles with a short-length handle, an elongated straight handle, and a handle with a 90 degree removable extension section being disclosed.

A SEVENTH EXAMPLE, U.S. Pat. No. 6,070,498 to Mislich, et al. teaches a tool for removing shingles and nails from a roof in which the tool has a base mounting plate which has a plurality of forwardly extending tines. The tines are adapted for pushing under the shingles. The tines pry the shingles loose from the roof. A plurality of forwardly extending teeth are positioned on the base plate below and rearward of the tines. The teeth remove nails remaining on the roof after the shingles are removed. Both the tines and teeth operate when the tool is pushed in a forwardly shingle removing direction.

AN EIGHTH EXAMPLE, U.S. Pat. No. 6,446,401 to Krupp teaches a tool and a method for using a tool that is particularly useful to individuals engaged in the roofing and roof removal trades. The tool is configured in such a way as to make removal of a shingled roof much easier and with much less strain and effort on the part of the roof remover. The device provides for easy insertion of elongated arms under the shingles in the gap between the boards in the roof base and for a vertical engagement of shingle layers, which makes both inserting the device under the material to be removed and lifting of the layers much easier. After insertion of the device, the shingles are lifted until they are detached from the roof base or the handle of the device may be rotated to lift and disengage the roofing material from the roof base. Prior art devices used for similar tasks all involve horizontal engagement under the roof layers and a chiseling action to release the shingles which is less efficient and more stressful on the workman's body than the present invention.

It is apparent that numerous innovations for pry bars have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a leverage utilizing bar for facilitating prying a flat member from a slender member that avoids the disadvantages of the prior art.

ANOTHER OBJECT of the present invention is to provide a leverage utilizing bar for facilitating prying a flat member from a slender member that is simple to use.

BRIEFLY STATED, STILL ANOTHER OBJECT of the present invention is to provide a leverage utilizing bar for facilitating prying a flat member from a slender member. A head extends from a handle. The head engages under the flat member and functions as a fulcrum by engaging the slender member and thereby cause the head to pry the flat member from the slender member when the handle is pushed away from the head by the fulcrum pivoting on the slender member. The head includes a pair of hook members and the handle includes a pair of shank members. The pair of hook members of the head together with the pair of shank members of the handle form a pair of main members, respectively, that are generally J-shaped. The pair of main members diverge from each other as they extend from a common proximal end to distal ends of the pair of hook members of the head so as to allow the head to straddle the slender member.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows.

LIST OF REFERENCE NUMERALS UTILIZED IN THE DRAWING

Figure 3:
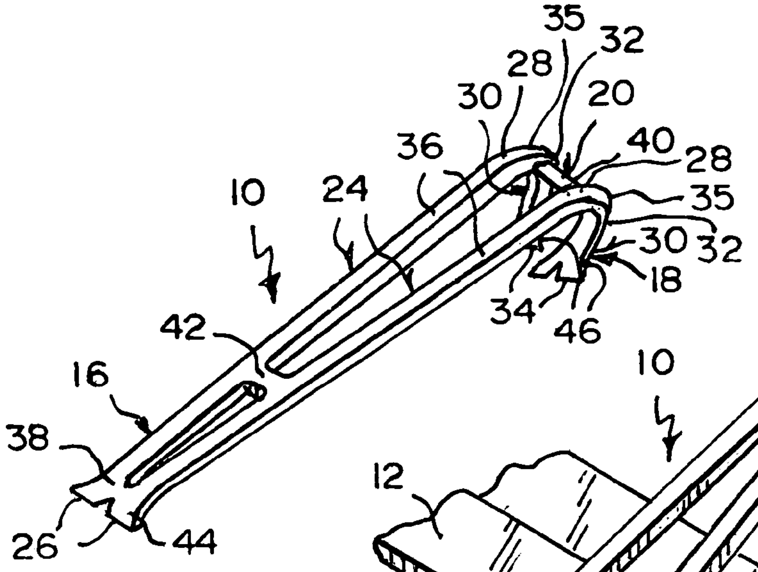
FIG. 3 is a reduced diagrammatic rear perspective view of the leverage utilizing bar.

10 leverage utilizing bar of present invention for facilitating prying flat member 12 from slender member 14
12 flat member
14 slender member
16 handle
18 head for engaging under flat member 12
20 fulcrum
22 arrow
24 pair of shank members of handle 16
26 proximal ends of pair of shank members 24 of handle 16, respectively
28 distal ends of pair of shank members 24 of handle 16, respectively
30 pair of hook members of head 18
32 proximal ends of pair of hook members 30 of head 18, respectively
34 distal ends of pair of hook members 30 of head 18, respectively
35 pair of nexus points
36 pair of main members
38 common proximal end of pair of main members 36
40 stub bar of fulcrum 20
42 cross member of pair of main members 36
44 claw of common proximal end 38 of pair of main members 36 for facilitating nail pulling and like
46 claws of distal ends 34 of pair of hook members 30 of head 18, respectively, for facilitating nail pulling and like

DETAILED DESCRIPTION OF THE PREFERRED EMBODIMENT

Figure 1:
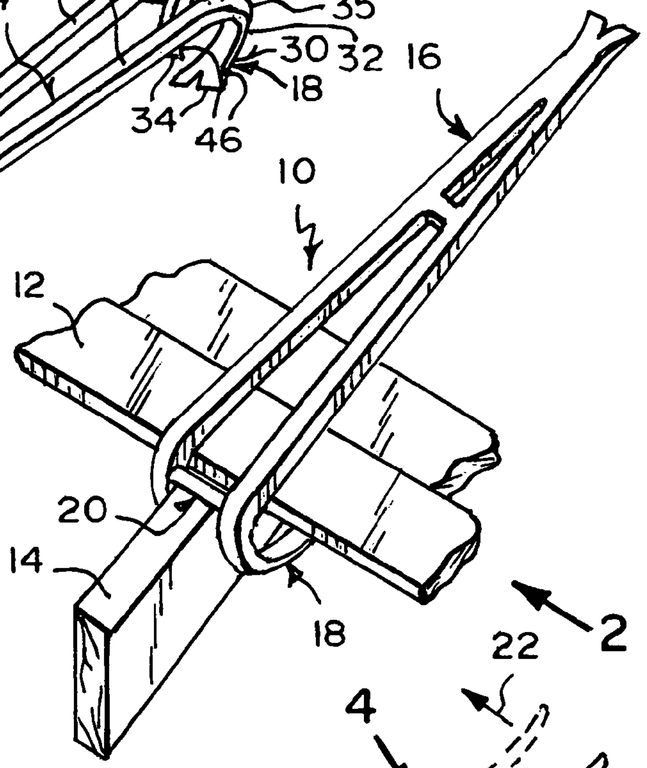
FIG. 1 is a diagrammatic front perspective view of a leverage utilizing bar of the present invention facilitating prying a flat member from a slender member.
Figure 2:
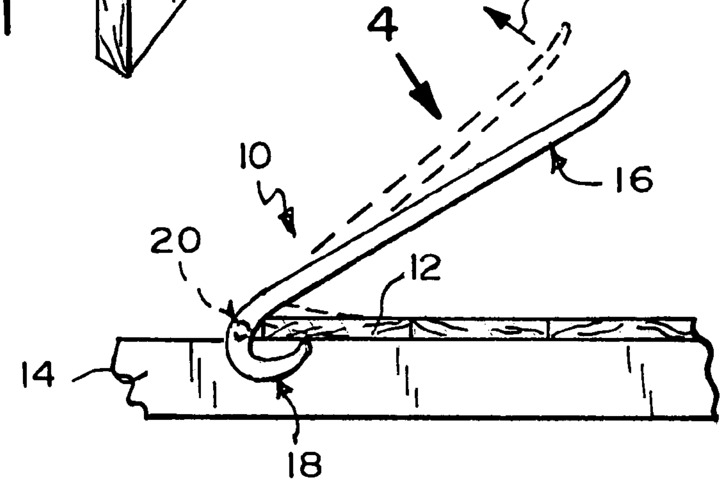
FIG. 2 is a reduced diagrammatic side elevational view taken generally in the direction of ARROW 2 in FIG. 1.

Referring now to the figures, in which like numerals indicate like parts, and particularly to FIGS. 1 and 2, which are, respectively, a diagrammatic perspective front view of a leverage utilizing bar of the present invention facilitating prying a flat member from a slender member, and, a reduced diagrammatic side elevational view taken generally in the direction of ARROW 2 in FIG. 1, the leverage utilizing bar of the present invention is shown generally at 10 for facilitating prying the flat member 12 from the slender member 14.

Figure 4:
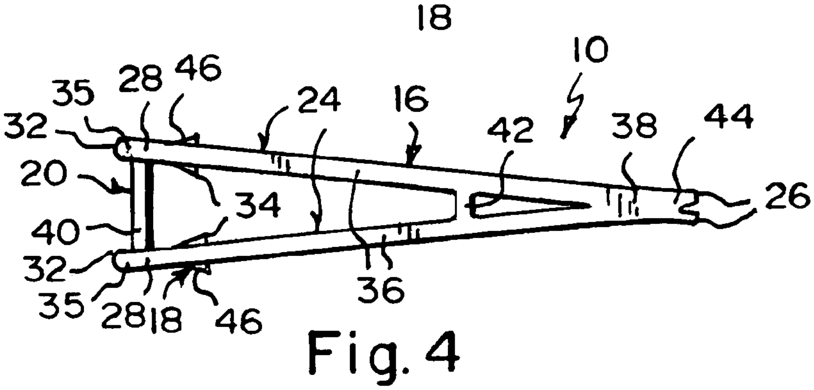
FIG. 4 is a diagrammatic top plan view taken generally in the direction of ARROW 4 in FIG. 2 of the leverage utilizing bar per se.

The configuration of the leverage utilizing bar 10 can best be seen in FIGS. 3 and 4, which are, respectively, a reduced diagrammatic rear perspective view of the leverage utilizing bar and, a diagrammatic top plan view taken generally in the direction of ARROW 4 in FIG. 2, of the leverage utilizing bar per se and as such, will be discussed with reference thereto.

The leverage utilizing bar 10 comprises a handle 16 and a head 18. The head 18 extends from the handle 16. The head 18 is for engaging under the flat member 12 (FIGS. 1 and 2) and functions as a fulcrum 20 by engaging the slender member 14 (FIGS. 1 and 2) and thereby cause the head 18 to pry the flat member 12 from the slender member 14 when the handle 16 is pushed away from the head 18 in a direction of arrow 22 (FIG. 2) by the fulcrum 20 pivoting on the slender member 14.

The handle 16 comprises a pair of shank members 24. The pair of shank members 24 of the handle 16 have proximal ends 26, respectively, and distal ends 28, respectively.

The head 18 comprises a pair of hook members 30. The pair of hook members 30 of the head 18 have proximal ends 32, respectively, and distal ends 34, respectively.

The pair of hook members 30 of the head 18 extend from the pair of shank members 24 of the handle 16, respectively, with the proximal ends 32 of the pair of hook members 30 of the head 18 being coincident with the distal ends 28 the pair of shank members 24 of the handle 16, respectively, so as to form a pair of nexus points 35 thereat.

The pair of shank members 24 of the handle 16 are slender, elongated, and generally straight.

The pair of hook members 30 of the head 18 are slender, elongated, and generally U-shaped and together with the pair of shank members 24 of the handle 16 form a pair of main members 36 that are generally J-shaped.

The proximal ends 26 of the pair of shank members 24 of the handle 16 are joined to each other to form a common proximal end 38 of the pair of main members 36.

The pair of main members 36 diverge from each other as they extend from the common proximal end 38 thereof to the distal ends 34 of the pair of hook members 30 of the head 18 for allowing the head 18 to straddle the slender member 14.

The fulcrum 20 extends from one nexus point 35 to the other nexus point 35 and ties the pair of hook members 30 of the head 18 to each other, while keeping the pair of hook members 30 of the head 18 properly spaced-apart from each other.

The fulcrum 20 is a stub bar 40. The stub bar 40 of the fulcrum 20 is slender and round in lateral cross section for facilitating pivoting on the slender member 14.

The pair of main members 36 further have a cross member 42. The cross member 42 of the pair of main members 36 extends from one main member 36 to the other main member 36, at a location intermediate the common proximal end 38 of the pair of main members 36 and the fulcrum 20. The cross member 42 of the pair of main members 36 ties the pair of shank members 24 of the handle 16 to each other, while keeping the pair of shank members 24 of the handle 16 properly spaced-apart from each other.

The cross member 42 of the pair of main members 36 is slender.

The common proximal end 38 of the pair of main members 36 is formed into a claw 44 for facilitating nail pulling and the like, and the distal ends 34 of the pair of hook members 30 of the head 18 are formed into claws 46, respectively, for facilitating nail pulling and the like.

It will be understood that each of the elements described above, or two or more together, may also find a useful application in other types of constructions differing from the types described above.

While the invention has been illustrated and described as embodied in a leverage utilizing bar for prying a flat member from a slender member, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A leverage utilizing bar for facilitating prying a flat member from a slender member, comprising:

a) a handle; and b) a head;

wherein said head extends from said handle; and wherein said head is for engaging under the flat member and functions as a fulcrum by engaging the slender member and thereby cause said head to pry the flat member from the slender member when said handle is pushed away from said head by said fulcrum pivoting on the slender member, wherein said handle comprises a pair of shank members, wherein said pair of shank members of said handle have proximal ends, respectively; and wherein said pair of shank members of said handle have distal ends, respectively, wherein said head comprises a pair of hook members, wherein said pair of hook members of said head have proximal ends, respectively; and wherein said pair of hook members of said head have distal ends, respectively, wherein said pair of hook members of said head together with said pair of shank members of said handle form a pair of main members, wherein said proximal ends of said pair of shank members of said handle are joined to each other to form a common proximal end of said pair of main members, wherein said pair of main members have a cross member, wherein said cross member of said pair of main members extends from one main member to the other main member; and wherein said cross member of said pair of main members is disposed at a location intermediate said common proximal end of said pair of main members and said fulcrum.

2. The bar as defined in claim 1, wherein said pair of hook members of said head extend from said pair of shank members of said handle, respectively, with said proximal ends of said pair of hook members of said head being coincident with said distal ends said pair of shank members of said handle, respectively, so as to form a pair of nexus points thereat.

3. The bar as defined in claim 1, wherein said pair of shank members of said handle are slender;

wherein said pair of shank members of said handle are elongated; and wherein said pair of shank members of said handle are generally straight.

4. The bar as defined in claim 1, wherein said pair of hook members of said head are slender;

wherein said pair of hook members of said head are elongated; and wherein said pair of hook members of said head are generally U-shaped.

5. The bar as defined in claim 1, wherein said pair of main members are generally J-shaped.

6. The bar as defined in claim 1, wherein said pair of main members diverge from each other as they extend from said common proximal end thereof to said distal ends of said pair of hook members of said head for allowing said head to straddle the slender member.

7. The bar as defined in claim 1, wherein said fulcrum extends from one nexus point to the other nexus point; and wherein said fulcrum ties said pair of hook members of said head to each other, while keeping said pair of hook members of said head properly spaced-apart from each other.

8. The bar as defined in claim 1, wherein said fulcrum is a stub bar.

9. The bar as defined in claim 1, wherein said stub bar of said fulcrum is slender; and wherein said stub bar of said fulcrum is round in lateral cross section for facilitating pivoting on the slender member.

10. The bar as defined in claim 1, wherein said cross member of said pair of main members ties said pair of shank members of said handle to each other, while keeping said pair of shank members of said handle properly spaced-apart from each other.

11. The bar as defined in claim 1, wherein said cross member of said pair of main members is slender.

12. The bar as defined in claim 1, wherein said common proximal end of said pair of main members is formed into a claw; and wherein said claw of said common proximal end of said pair of main members is for facilitating nail pulling.

13. The bar as defined in claim 1, wherein said distal ends of said pair of hook members of said head are formed into claws, respectively; and wherein said claws of said distal ends of said pair of hook members of said head, respectively, are for facilitating nail pulling.

* * * * *